April 28, 1970  D. M. PHILLIPS  3,509,518
HIGH VOLTAGE CABLE CONNECTORS
Filed March 11, 1968
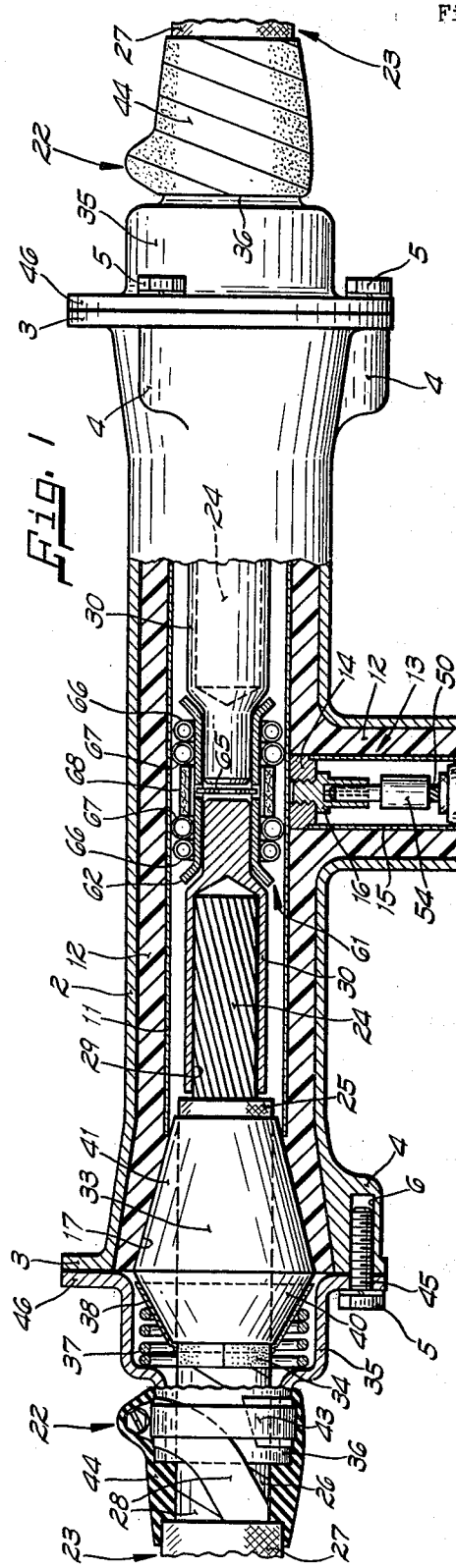
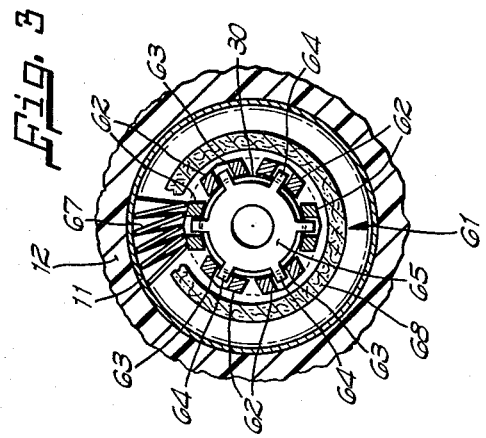
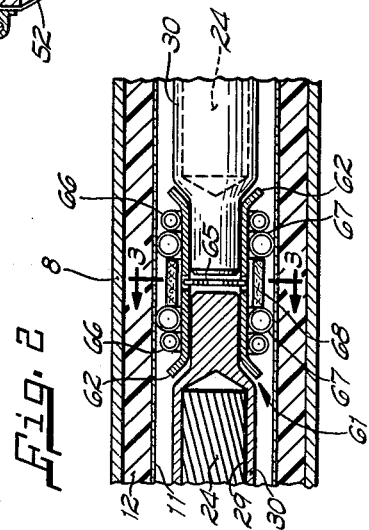
INVENTOR.
Davis M. Phillips
BY Thomas E Torphy
Attorney

United States Patent Office 3,509,518
Patented Apr. 28, 1970

3,509,518
HIGH VOLTAGE CABLE CONNECTORS
Davis M. Phillips, South Milwaukee, Wis., assignor to McGraw-Edison Company, Milwaukee, Wis., a corporation of Delaware
Filed Mar. 11, 1968, Ser. No. 712,292
Int. Cl. H01r 13/58, 17/08
U.S. Cl. 339—103                                4 Claims

ABSTRACT OF THE DISCLOSURE

A high voltage connector assembly for joining the ends of high voltage shielded electrical cables. The assembly comprises a generally tubular metallic housing with internal insulation. The cable ends are connected by tulip type contacts. Internal voids are shielded by shielding means including current carrying springs. Removable sealing and electrical stress relieving cap structures surround the cables and close the ends of the assembly.

BACKGROUND OF THE INVENTION

The invention relates to high voltage cable connectors including cable end electrical stress relief means and, more particularly, to such connectors which are of uniform construction and may be easily assembled and disconnected.

With the widespread increase in underground construction of electrical power distribution systems, it becomes increasingly necessary to develop cable connection devices which are suitable for such service and which are economical, reliable and easily and quickly assembled. Such connectors should also be easily disassembled and reassembled if the need arises for repair or modification of the system or components. Because of the location and environment of such connectors in underground vaults, it is highly desirable for reliability and safety reasons that such connectors be enclosed and protected by grounded and sealed metallic enclosures of high mechanical strength.

Prior connector assemblies having permanently connected conductors and which required slow and laborious preparation, such as the tapping of stress relief cones or the soldering of lead sheathes, failed to meet the aforementioned requirements of modern distribution system construction practice.

SUMMARY OF THE INVENTION

It is, therefore, an object of the invention to provide a high voltage cable connector suitable for underground use which is reliable, economical and easily assembled and disassembled.

It is another object of the invention to provide a connector of the aforedescribed type which includes efficient electrical shielding means for shielding internal voids from electrical stress.

It is still another object of the invention to provide a connector of the aforedescribed type which includes tapping means for accomplishing a tap from the main conductive members or third connection point in a cable connection or splice.

Other objects and advantages will become apparent upon reading the following description.

These objects are accomplished by providing a metallically housed body with internal insulation surrounding electrical shielding means which, in turn, surrounds the internal space in which the cable connecting members are enclosed. The cable conductor ends are provided with terminal contact means which cooperate with a contact assembly within the central void of the connector body. This contact assembly includes spring means for providing contact pressure and conductive spring means for providing an electrically conductive path between the contacts and the surrounding shield. The ends of the body are closed by cap means which surround the cables in sealing engagement therewith and provide electrical stress relief.

There is further provided tap means extending through a side of the body for accomplishing an electrical tap from the main conductive path. The tap connection is made from the shielding means within the body of the connector.

BRIEF DESCRIPTION OF THE DRAWING

FIGURE 1 is a partially sectional elevation view of a cable connector embodying the present invention;

FIGURE 2 is a sectional fragmentary view of a modification of the device shown in FIGURE 1; and FIGURE 3 is a fragmentary sectional view taken on line 3—3 of FIGURE 2.

DESCRIPTION OF THE PREFERRED EMBODIMENT

Referring to FIGURE 1, the preferred embodiment of the invention has an outer housing 2 preferably constructed of cast aluminum. Body 2 has a main portion of circular cylindrical shape which is flared outwardly in conical portions at either end. The connector device illustrated is nearly symmetrical about its center, and similar elements thereof at opposite ends will be similarly numbered. A pair of flanges 3 are formed about the periphery of the ends of housing 2. These bosses 4 are formed integrally with housing 2 at each end of housing 2 to accommodate axially directed screws 5 which threadingly engage threaded apertures 6 which are formed within bosses 4 and which open through flanges 3.

The embodiment illustrated in FIGURE 1 includes a laterally directed cylindrical branch 7 extending from the midpoint of a side of housing 2. FIGURE 2 illustrates a modified embodiment which does not include a side branch, but instead has an unbranched housing 8 which is otherwise similar to housing 2.

A brass tube 11 is aligned concentrically within housing 2. Tube 11 is supported within housing 2 and insulated therefrom by a body of insulating material such as cast epoxy which completely fills the space between tube 11 and body 2 and extends beyond the ends of tube 11 to terminate flush with the end surfaces of housing 2. A tap assembly 13 is similarly constructed within the branch 7 of housing 2. A conductive metal bushing 14 has an upper surface formed to fit the cylindrical outer surface of tube 11 and is soldered thereto to make good electrical contact therewith. Bushing 14 is circular in shape and the lower periphery thereof is stepped to accommodate the upper end of a branch shielding tube 15 which is soldered thereto. The insulating body 12 extends downwardly between branch tube 15 and the interior surface of the branch 7 of housing 2 to support and insulate tube 15. Insulating body 12 extends beyond the lower end of tube 15 to terminate flush with the end of branch 7. A tulip type contact 16 of conventional construction is threaded into and fastened to bushing 14. A frusto-conical surface 17 is formed within each of the opposing ends of the main portion of insulating body 12. Similarly, a smaller frusto-conical surface 20 is formed within the end of insulating body 12 at the open end of branch 7. The end of branch 7 is furnished with a plurality of integral brackets, such as bracket 18, each of which has a threaded central aperture to accommodate a screw, such as screw 19.

Each end of the main portion of housing 2 is provided with means for removably attaching a cable termination assembly 22. These cable termination assemblies 22 are identical, and similar elements will be given the same reference numerals.

Each cable termination assembly 22 includes a cable 23 of the high voltage concentrically shielded type. Cable 23 comprises a central conductor 24, an insulating layer 25, a concentric shielding layer 26 and an outer insulating covering layer 27. The shielding layer 26 comprises a series of helically wound copper ribbons 28.

The cable termination assembly 22 is prepared by initially cutting back the outer layers of cable 23 with insulating layer 25 removed for a length sufficiently to permit central conductor 24 to be inserted fully to the inner end of a central cylindrical recess 29 of a contact member 30. Contact member 30 is then crimped to the end of central conductor 24.

Shielding layer 26 is cut back for a length sufficient to accommodate a resilient gland 33 which is slipped over the exposed surface of insulating layer 25 in tight engagement therewith. Several turns of tape 34 are placed over the end of shielding layer 26 to hold the individual conductive ribbons 28 in place. Before gland 33 is slipped over insulating layer 25, a generally bell-shaped cap 35 is placed over the end of cable 23 and with its small end facing outwardly. A compression spring 37 is placed in the cup-shaped middle portion of cap 35. A frusto-conical washer 38 is placed over the end of cable 23 with its small end within spring 37. Gland 33 is then slipped over insulating layer 25. Gland 33 consists of base-to-base frusto-conical portions 40 and 41. Portion 40 is formed to closely fit the interior shape of washer 38, while portion 41 is formed to fit tightly within frusto-conical portion 17.

To complete the cable termination assembly 22, one of the copper tapes 28 is wound over the small end of cap 35 and firmly clamped thereto by a circular clamp 43. A covering 44 of insulating electrical tape is wound over the end of cable covering 27, shielding layer 26, clamp 43 and the small end 36 of cap 35 to provide a watertight seal.

When cable termination assembly 22 is assembled to housing 2, a plurality of apertures 45 in a flange 46 on the periphery of cap 35 are aligned with threaded apertures 6. Screws 5 are inserted therein and firmly tightened to fasten cap 35 to the end of housing 2.

The compressive force of spring 37 on cone 38 serves to compress gland 33 against the surface of recess 17 to form a tight seal therebetween. Frusto-conical washer 38 is electrically connected to cap 35 through spring 37 and is so shaped to form an electrical stress relief cone.

A branch or tap connection is made through a smaller branch cable termination assembly 48. A branch cable 49 is provided with a central conductor 50, an insulating layer 51, a semi-conductive layer 52 and outer helically wound concentric neutral conductors 53. A male contact 54 is crimped over the end of central conductor 50. A resilient gland 55 fits over the exposed surface of insulating layer 51. Gland 55 is smaller than, but otherwise similar to, gland 33. A stress relief and compression cone 56 is placed on the outer side of gland 55 with its smaller end over the end of semiconductive layer 52. Cone 56 is fastened to housing branch 7 by screws 19 to firmly compress gland 55 within recess 20. The ends of conductors 53 are placed over the small end of cone 56 and fastened thereto by a circular clamp 58. The free ends of conductors 53 may be grouped into a pigtail 59 and connected to a convenient ground connection (not shown).

Contact 54 may be disconnected from contact 16 by the removal of screws 19 and the withdrawal of termination assembly 48 from the opening of branch 7.

The inner ends of contacts 30 are electrically connected by a main contact assembly 61. The ends of contacts 30 are bridged by six contact segments 62 which are equally spaced about the circumference of the ends of contacts 30. Each of contact segments 62 has a central aperture 63 which accommodates a radially extending one of the legs 64 of a flat spider member 65. The engagement of legs 64 with contact segments 62 serves to maintain the axial alignment and circumferential spacing of contact segments 62. The ends of contact segments 62 are bent upwardly to facilitate the insertion of contacts 30 into contact assembly 61. A pair of circular helically wound tension springs 66 near the end of contact segments 62 provide contact pressure between contact segments 62 and the ends of contacts 30.

A larger pair of circular helically wound springs 67 serve to provide electrical contact between contact segments 62 and shielding tube 11. The diameter of the helical coils of springs 67 is somewhat greater than the radial spacing between contact segments 62 and the inner surface of shielding tube 11. The coils of springs 67 are, therefore, compressed diametrically and tilted or distorted somewhat, as shown in FIGURE 3. Spring 67, therefore, provides yielding spring contact between contact segments 62 and shielding tube 11. Spring 67 also serves to position contact assembly 61 centrally within shielding tube 11. A cylindrical insulating spacer 68 is placed between springs 67 to keep springs 67 and springs 66 properly positioned towards the ends of contact segments 62.

Since tube 11 is electrically connected to central conductors 24, tube 11 serves to shield the void spaces within tube 11 against electrical stresses and thereby prevent corona discharge therein and prevent consequent failure of the device. Similarly, tube 15 shields the void spaces within the branch 7. No voids exist between housing 2 and tubes 11 and 15 since the insulating body 12 is cast to fill all intermediate spaces.

It can be seen the contact assembly can be moved within tube 11 in an axial direction since springs 67 are not attached to but only frictionally engage the interior surface of tube 11. This arrangement produces two particularly advantageous results. First, contact assembly 61 may be assembled before insertion within tube 11 and need not be assembled within the confines of tube 11. Secondly, the freedom of axial movement of contact assembly 61 permits accommodation of variations between the lengths of the cable termination assemblies 22 since contact assembly may shift axially if one of contacts 30 extends further into tube 11 than does the other.

Although the embodiments disclosed are adapted to fulfill the stated objects, it is not intended that the invention be limited to the illustrated embodiments since they are susceptible to modification.

I claim:
1. A connection assembly for first and second ends of high voltage cables, said cables each comprising a central conductor, an outer coaxial conductive layer and an intermediate insulating layer, said connection assembly comprising:
    an outer conductive housing having a generally elongate cylindrical shape and having openings at each end for the entry of said first and second ends;
    first and second contact means attached to said first and second ends;
    conductive means arranged centrally and axially within said housing for forming a bridging conductive path between said first and second ends, said conductive means including third contact means for making electrical contact with said first and second contact means;
    conductive shielding means interior of said housing, spaced apart therefrom and radially surrounding said first and second ends, said first and second contact means and said conductive means;
    solid electrical insulating means between said housing and said shielding means;
    connecting means for electrically connecting said conductive means to said shielding means to thereby render said shielding means effective to shield voids internal to said shielding means from electrical stresses;

resilient gland means for closing said openings in said connection assembly and for providing a seal between said insulating means and said cables;

cap means fastened to said housing for closing said openings and covering the outer ends of said gland means; and spring means between said cap means and the outer ends of said gland means for pressing said gland means into said openings.

2. The invention as defined in claim 1 in which:

said insulating means comprises frustoconical inner surface portions adjacent said openings with the large end of said frustoconical portions facing outwardly; and said gland means comprises frustoconical ends facing and fitting closely within said frustoconical portions of said insulating means.

3. A connection assembly for first and second ends of high voltage cables, said cables each comprising a central conductor, an outer coaxial conductive layer and an intermediate insulating layer, said connection assembly comprising:

an outer conductive housing having a generally elongate cylindrical shape and having openings at each end for the entry of said first and second ends;

first and second contact means attached to said first and second ends;

conductive means arranged centrally and axially within said housing for forming a bridging conductive path between said first and second ends, said conductive means including third contact means for making electrical contact with said first and second contact means, said third contact means including a plurality of contacts peripherally around said first and said second contact means and held into contact therewith by spring bias means;

conductive shielding means interior of said housing comprising a cylindrical conductor spaced apart and radially surrounding said first and second ends, said first and second contact means and said conductive means;

solid electrically insulating means between said housing and said shielding means; and connecting means for electrically connecting said conductive means to said shielding means to thereby render said shielding means effective to shield voids internal to said shielding means from electrical stresses, said connecting means comprises conductive spring means between said conductive means and said shielding means.

4. The invention as defined in claim 3 together with a tap connection comprising:

an outer tubular member extending radially from the side of said housing;

an inner conductive member attached ot said shielding means and arranged centrally within said tubular member;

tap shielding member surrounding said inner conductive member and connected to said shielding means;

an insulating member between said tap shielding member and said outer tubular member; and said tap connection being open at its outer end to provide access for electrical connection to said inner conductive member.

References Cited

UNITED STATES PATENTS

| | | | |
|---|---|---|---|
| 2,379,942 | 7/1945 | Webber | 339—60 |
| 2,754,487 | 7/1956 | Carr et al. | 339—177 X |
| 3,056,940 | 10/1962 | Winestock | 339—177 X |
| 3,181,105 | 4/1965 | Roach et al. | 339—103 X |
| 3,413,407 | 11/1968 | Potter | 339—94 X |
| 2,967,901 | 1/1961 | Priaroggia | 174—73 |

RICHARD E. MOORE, Primary Examiner

U.S. Cl. X.R.

339—143, 177